Patented Oct. 16, 1934

1,976,749

UNITED STATES PATENT OFFICE 1,976,749

SAFETY GLASS

Joseph D. Ryan, Toledo, Ohio, assignor to Libbey-Owens-Ford Glass Company, Toledo, Ohio, a corporation of Ohio No Drawing. Application April 2, 1932, Serial No. 602,874

4 Claims. (Cl. 49—81)

The present invention relates to the art of safety glass manufacture, and more particularly to a bonding material or adhesive for use in the bonding together of glass and cellulose acetate plastic.

Stated broadly, the invention resides in the formation and use of hydrocellulose acetate in such a bonding mixture. I have found that acetate of hydrocellulose, when dispersed or dissolved in suitable plasticizers or high boiling point, low vapor pressure solvents therefor, makes a very excellent adhesive for bonding cellulose acetate plastic to glass surfaces.

The acetic ester of cellulose hydrate is characterized by its solubility in that it is more soluble in water-acetone mixtures, for example, than ordinary cellulose acetate and in contradistinction to cellulose acetate, films formed from hydrocellulose acetate possess greater adhesive properties to glass surfaces than films made from cellulose acetate.

The preparation of the acetic ester of cellulose hydrate differs from the acetic ester of cellulose in that the cellulose (which is the starting point for the preparation of the cellulose acetate) is first subjected to a hydrating action before it is acetylized to form the hydrocellulose acetate. Stated briefly, hydrocellulose acetate is prepared by taking ordinary purified cotton, which consists essentially of cellulose, and converting it into hydrocellulose by any of the well known methods.

For example, this can be done by the action of acids, as follows:

Cellulose saturated with dilute hydrochloric acid and heated for a few hours at 70° C. is converted essentially into hydrocellulose. The other acids both organic and inorganic behave in a similar manner.

After the hydrocellulose is prepared, it is then acetylated by a mixture of acetic anhydride and acetic acid either in the presence or the absence of a catalyzer such as zinc chloride, sulphuric acid, and the like. I have obtained very satisfactory results by carrying out the acetylation reaction by treating approximately one pound of hydrocellulose, prepared as above described, with fifty pounds of the acetylating mixture consisting of approximately forty pounds of glacial acetic acid and ten pounds acetic anhydride. The reaction mixture is then permitted to stand at room temperatures until substantially all of the hydrocellulose has disappeared, which means that the hydrocellulose has been converted mainly into the triacetate of hydrocellulose which is soluble in the acetylating bath.

The acetic ester of the hydrocellulose is precipitated from the acetylating bath by pouring the contents of the acetylating bath into a large volume of water. While the triacetate of hydrocellulose seems to give fair adhesion when dissolved or dispersed in the proper solvents and used as an adhesive for bonding cellulose acetate plastic to glass surfaces, it is more desirable to partially hydrolyze the resulting triacetate of hydrocellulose by boiling it for a short time in a dilute solution of hydrochloric acid to get substantially the diacetate of hydrocellulose. The reason for the latter step, namely, preparing the diacetate of hydrocellulose from the triacetate of hydrocellulose is that the diacetate of hydrocellulose has a much higher range of solubility in the common cellulose acetate plasticizers and high boiling point, low vapor pressure solvents.

In preparing the bonding agent for the manufacture of safety glass, the acetate derivative of hydrocellulose (which consists mainly of the diacetate) is dispersed or dissolved in any of the high boiling point, low vapor pressure solvents or plasticizers for hydrocellulose acetate, such as for example dimethyl phthalate, dibutyl phthalate, triacetin, and the like, in varying proportions. In selecting the plasticizers or high boiling point, low vapor pressure solvents, it is desirable to use only such solvents or mixtures thereof as will be stable in the safety glass when in normal use and which will not tend to adversely affect the interposed plastic layer of cellulose acetate.

I have found that the hydrocellulose acetate, as above prepared, can be dissolved or dispersed in most any of the common high boiling point, low vapor pressure solvents, plasticizers, or mixtures thereof, in concentrations ranging from 5% to 70% of the hydrocellulose acetate. It is of course to be understood that in using the higher concentrations of the hydrocellulose acetate, it is necessary to decrease the viscosity of the solution or adhesive with one or more of the common volatile solvents, for example, acetone, ethyl acetate, monomethyl ether of ethylene glycol, and the like, to facilitate the spreading by any known means, as by spraying, rolling, and the like, of the adhesive material in a relatively thin layer on either the glass surfaces or the surfaces of the interposed plastic layer.

In those cases where the higher concentrations of the hydrocellulose acetate are used together with the volatile solvents, it will be understood that it is to be preferred that the volatile solvents be evaporated before bonding of the laminations.

The above process can be modified by starting with ordinary cellulose acetate bought on the open market, which consists mainly of the diacetate of cellulose and subjecting the same to a mild hydrating treatment similar to that used in producing hydrocellulose from cellulose. This method of producing the hydrocellulose acetate has been tried and proven satisfactory for commercial purposes.

While I have found a number of methods that will convert the ordinary cellulose diacetate into the hydrocellulose acetate, the one that I have found to give most satisfactory results is as follows:

100 grams of cellulose diacetate bought on the open market, suspended in approximately 3 liters of water, then raising the temperature of the mixture to its boiling point, after which approximately 20 cc. of concentrated hydrochloric acid is added. Heating is continued for approximately two hours, thus converting a substantial amount of the cellulose acetate to the hydrocellulose acetate.

To recover the hydrocellulose acetate from the reaction bath, the entire mixture is filtered and the precipitate of hydrocellulose acetate is thoroughly washed and dried. The distinction between the hydrocellulose acetate and the cellulose acetate used as the starting product is readily found by determining the copper number, the solubility, and the adhesive characteristics of films made from the hydrocellulose acetate.

My improved cellulose acetate bonding material is prepared by dissolving or dispersing the hydrocellulose acetate, made as above described, in suitable plasticizers or high boiling point solvents or mixtures thereof.

While it may be desirable in some cases to apply my improved bonding material directly upon the surfaces of glass sheets, nevertheless I have found that equally satisfactory results can be obtained when my bonding material is applied to the cellulose acetate plastic sheet itself and then assembling the said coated plastic layer between properly cleaned glass sheets to form a sandwich which is subsequently subjected to the action of heat and pressure.

I have obtained excellent results in the way of bonding cellulose acetate plastic-glass laminations to form a well bonded unitary structure by subjecting the glass-plastic sandwich to a temperature of approximately 300° F. at a pressure ranging from 40 to 200 pounds per square inch for a period of from six to eight minutes.

I claim:

1. As a new article of manufacture, a sheet of safety glass comprising two sheets of glass and an interposed layer of cellulose ester plastic bonded together with a mixture containing hydrocellulose acetate.

2. As a new article of manufacture, a sheet of safety glass comprising two sheets of glass and an interposed layer of cellulose acetate plastic treated with a mixture containing hydrocellulose acetate.

3. As a new article of manufacture, a sheet of safety glass comprising two sheets of glass and an interposed layer of cellulose acetate plastic treated with a mixture consisting of hydrocellulose acetate dispersed in a plasticizer therefor.

4. As a new article of manufacture, a sheet of safety glass comprising two sheets of glass and an interposed layer of cellulose acetate plastic treated with a mixture consisting of hydrocellulose acetate dispersed in dimethyl phthalate.

JOSEPH D. RYAN.